United States Patent
Ozaki et al.

(10) Patent No.: US 8,334,791 B2
(45) Date of Patent: Dec. 18, 2012

(54) COMMUNICATION SYSTEM, COMMUNICATION CONTROL METHOD, AND ROADSIDE UNIT

(75) Inventors: Kazuyuki Ozaki, Kawasaki (JP); Yuuta Nakaya, Kawasaki (JP); Makoto Yoshida, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 323 days.

(21) Appl. No.: 12/883,841

(22) Filed: Sep. 16, 2010

(65) Prior Publication Data

US 2011/0063130 A1    Mar. 17, 2011

(30) Foreign Application Priority Data

Sep. 17, 2009   (JP) ................................. 2009-216117

(51) Int. Cl.
*G08G 1/00* (2006.01)
*G08B 1/08* (2006.01)
*H04B 17/00* (2006.01)
*B60Q 1/00* (2006.01)

(52) U.S. Cl. ..................... 340/905; 340/901; 340/539.1; 455/450; 455/67.11

(58) Field of Classification Search .................. 340/905
See application file for complete search history.

(56) References Cited

U.S. PATENT DOCUMENTS

| | | | | |
|---|---|---|---|---|
| 6,125,280 A | * | 9/2000 | Grandhi et al. | 455/446 |
| 6,301,233 B1 | * | 10/2001 | Ku et al. | 370/329 |
| 6,912,394 B1 | * | 6/2005 | Obata et al. | 455/450 |
| 2007/0135041 A1 | * | 6/2007 | Sawada et al. | 455/12.1 |

FOREIGN PATENT DOCUMENTS

| | | |
|---|---|---|
| JP | A-6-350503 | 12/1994 |
| JP | A-2000-358265 | 12/2000 |
| JP | 2002-290371 | 10/2002 |

* cited by examiner

*Primary Examiner* — Donnie Crosland
(74) *Attorney, Agent, or Firm* — Fujitsu Patent Center

(57) ABSTRACT

A communication system includes a roadside unit and a mobile communication unit that communicates with the roadside unit by using one of a plurality of communication channels. The mobile communication unit obtains, for each communication channel, a reception condition measurement representing the reception condition of a radio signal received from the roadside unit, creates information of a candidate channel for a receiving channel to be used to receive the radio signal from the roadside unit, and reports the candidate channel information to the roadside unit. On the other hand, the roadside unit assigns the receiving channel by selecting it from among the candidate channels, and reports the receiving channel to the mobile communication unit.

10 Claims, 11 Drawing Sheets

COMMUNICATION SYSTEM, COMMUNICATION CONTROL METHOD, AND ROADSIDE UNIT

CROSS-REFERENCE TO RELATED APPLICATION

This application is based upon and claims the benefit of priority of the prior Japanese Patent Application No. 2009-216117, filed on Sep. 17, 2009, the entire contents of which are incorporated herein by reference.

FIELD

The embodiments discussed herein are related to a communication system for communication between a roadside unit and a mobile communication unit mounted on a mobile vehicle, a communication control method, and a roadside unit that can be used in such a communication system.

BACKGROUND

In recent years, research has been proceeding on implementation of Intelligent Transportation Systems (ITS) in order to improve safety, efficiency, and comfort of road traffic. ITS enables vehicles on the road or pedestrians to share various kinds of information by using, for example, Dedicated Short-Range Communications (DSRC). In DSRC, information is exchanged, for example, between a communication unit mounted on a vehicle and a roadside unit installed along a road or between vehicle-mounted communication units.

In DSRC, when a vehicle equipped with a communication unit enters the communication range of a roadside unit, a communication channel is established between the vehicle-mounted communication unit and the road side unit so that they can exchange information with each other. To enable this, a technology has been developed that assigns a communication channel between a vehicle-mounted communication unit and a roadside unit (refer, for example, to Japanese Laid-Open Patent Publication Nos. H06-350503 and 2000-358265).

In one example of such prior known art, mutually different specific pseudo-random noise codes in code division multiple access are assigned to a pilot channel, an uplink control channel, and a downlink control channel, respectively. Then, the roadside unit transmits data on the downlink control channel and voice channel in synchronism with the pilot channel. On the other hand, the mobile unit performs the despreading and demodulation of the downlink control channel and voice channel based on the timing of pilot channel synchronization seizure, and performs processing to detect distance from the correlation output of the pilot channel synchronization seizure. The mobile unit changes the phase of the pilot channel between adjacent roadside units. In another example of the prior known art, a time slot is assigned to each entering vehicle. In this case, the vehicle is assigned a time slot that is vacant not only in the current radio zone but also in the radio zone located adjacent to the current radio zone in the traveling direction of the vehicle.

SUMMARY

According to one embodiment, a communication system which includes a roadside unit and a mobile communication unit that performs communication with the roadside unit by using one of a plurality of communication channels is provided. In this communication system, the mobile communication unit includes: a communication condition measuring unit which, based on radio signals received from the roadside unit and other communication units, obtains for each of the plurality of communication channels a reception condition measurement representing a reception condition of the radio signal received from the roadside unit; and a channel information reporting unit which selects at least one of the plurality of communication channels as a candidate channel, and which reports candidate channel information determined based on the reception condition measurement of the candidate channel to the roadside unit. On the other hand, the roadside unit includes: a receiving channel assigning unit which, based on the candidate channel information, assigns from among the candidate channels a receiving channel that the mobile communication unit is to use to receive the radio signal from the roadside unit; and a receiving channel reporting unit which reports the receiving channel to the mobile communication unit.

According to another embodiment, a communication control method for use in a communication system which includes a roadside unit and a mobile communication unit that performs communication with the roadside unit by using one of a plurality of communication channels is provided. In this communication control method, the mobile communication unit, based on radio signals received from the roadside unit and other communication units, obtains for each of the plurality of communication channels a reception condition measurement representing a reception condition of the radio signal received from the roadside unit, selects at least one of the plurality of communication channels as a candidate channel, and reports candidate channel information determined based on the reception condition measurement of the candidate channel to the roadside unit. On the other hand, the roadside unit, based on the candidate channel information, assigns from among the candidate channels a receiving channel that the mobile communication unit is to use to receive the radio signal from the roadside unit, and reports the receiving channel to the mobile communication unit.

According to still another embodiment, a roadside unit that performs communication with a mobile communication unit by using one of a plurality of communication channels is provided. The roadside unit includes: a receiving channel assigning unit which assigns from among the plurality of communication channels a receiving channel that the mobile communication unit is to use to receive a radio signal from the roadside unit, based on a reception condition measurement representing a reception condition of the radio signal received from the roadside unit, the reception condition measurement being calculated for each of the plurality of communication channels by the mobile communication unit based on radio signals received from the roadside unit and other communication units; a receiving channel reporting unit which reports the receiving channel to the mobile communication unit; and a communication execution unit which performs communication with the mobile communication unit by using the receiving channel.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
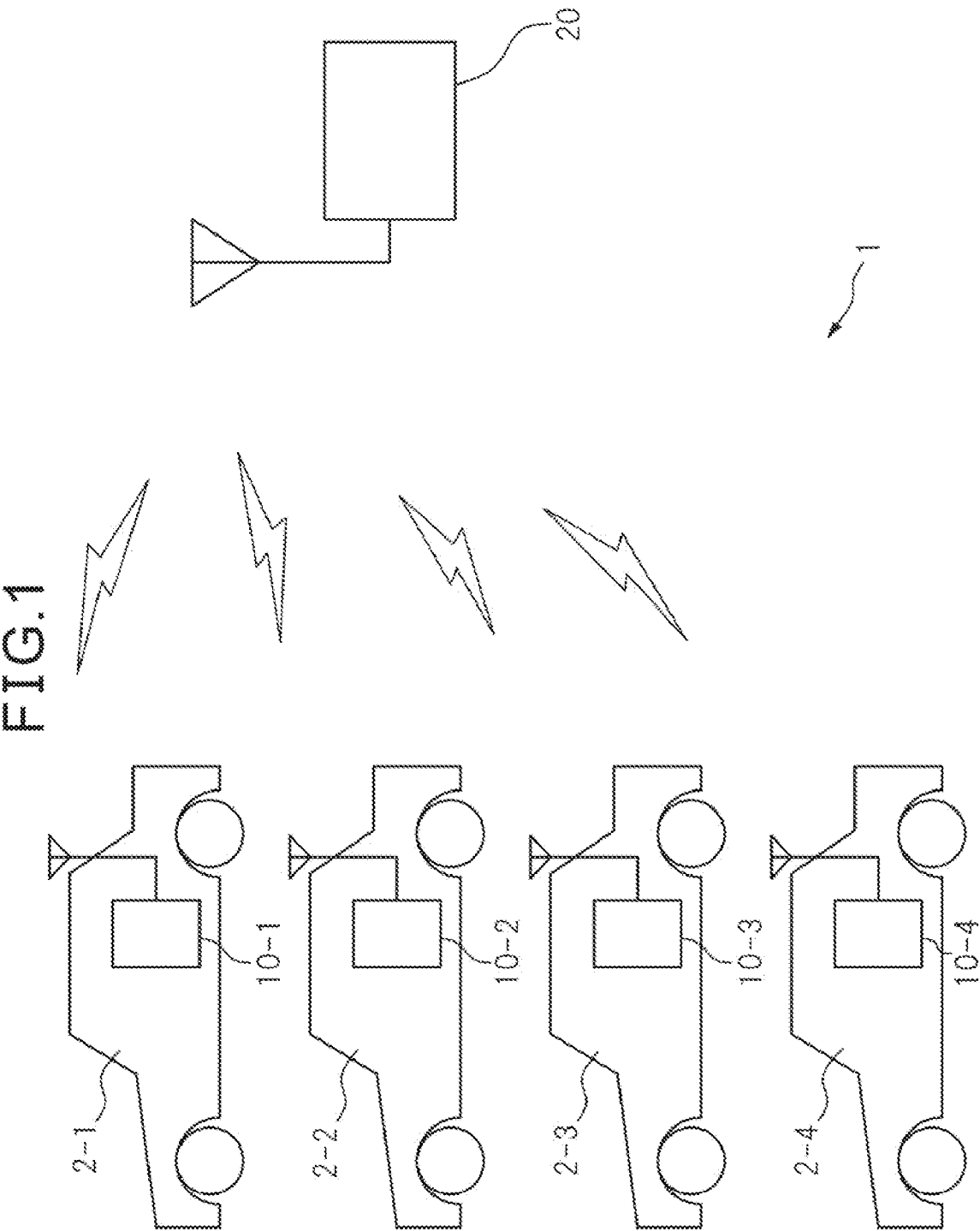
FIG. 1 is a diagram schematically illustrating the configuration of a communication system according to one embodiment.

In the earlier described communication system, a plurality of vehicles, each equipped with a communication unit, may be simultaneously located within the communication range of the roadside unit. In this case, the communication unit mounted on any one of the plurality of vehicles is unable to detect whether some other vehicle is currently communicating with the roadside unit, unless that other vehicle is located within the carrier sense range of the communication unit. As a result, if each of the plurality of vehicle-mounted communication units performs carrier sensing and selects a communication channel that is determined to be a channel not being used by any other vehicle-mounted communication unit or the roadside unit, there can occur cases where the same channel is used by more than one vehicle-mounted communication unit. In such cases, the same channel may be set up for signal reception by more than one vehicle-mounted communication unit, and the roadside unit may become unable to transmit signals to each individual one of these communication units.

A communication system according to one embodiment will be described below with reference to drawings. In this communication system, a vehicle-mounted communication unit as an example of a mobile communication unit performs communication with another vehicle-mounted communication unit or with a roadside unit installed along the road or on the roadside. In this communication system, the vehicle-mounted communication unit and the roadside unit each transmit a signal by using one of a plurality of predetermined communication channels. When selecting a communication channel to be used for signal reception from the roadside unit, the vehicle-mounted communication unit measures the reception condition of a radio signal received from the roadside unit for each communication channel by taking into account the influence of signals being transmitted from other communication units, such as other vehicle-mounted communication units, other than the roadside unit. Then, the vehicle-mounted communication unit selects communication channels with good reception conditions and reports them as candidate channels to the roadside unit. From among the candidate channels received from the vehicle-mounted communication unit, the roadside unit assigns a receiving channel as the channel to be actually used by the vehicle-mounted communication unit to receive the radio signal from the roadside unit. Then, the roadside unit reports the receiving channel to the vehicle-mounted communication unit.

In the present embodiment, it is assumed that the plurality of communication channels are time slots obtained by dividing one frame having a prescribed time length along a time axis in accordance with a time-division multiplexing scheme. However, the communication channels need not necessarily be implemented as time slots. For example, in an alternative embodiment, each communication channel may be implemented as one of a plurality of frequency bands obtained by frequency-division multiplexing.

FIG. 1 is a diagram schematically illustrating the configuration of the communication system 1 according to the one embodiment. The communication system 1 includes vehicle-mounted communication units 10-1 to 10-4 and a roadside unit 20. The vehicle-mounted communication units 10-1 to 10-4 are mounted on vehicles 2-1 to 2-4, respectively. When any one of the vehicles 2-1 to 2-4 equipped with the vehicle-mounted communication units 10-1 to 10-4 enters the communication range of the roadside unit 20, the communication unit mounted on that vehicle can communicate with the roadside unit 20 via a radio link. Similarly, when any one of the vehicle-mounted communication units 10-1 to 10-4 enters the communication range of another one of the vehicle-mounted communication units, the vehicle-mounted communication units can communicate with each other via a radio link.

The number of vehicle-mounted communication units contained in the communication system 1 is not limited to four. The number of vehicle-mounted communication units necessary is at least one.

Figure 2:
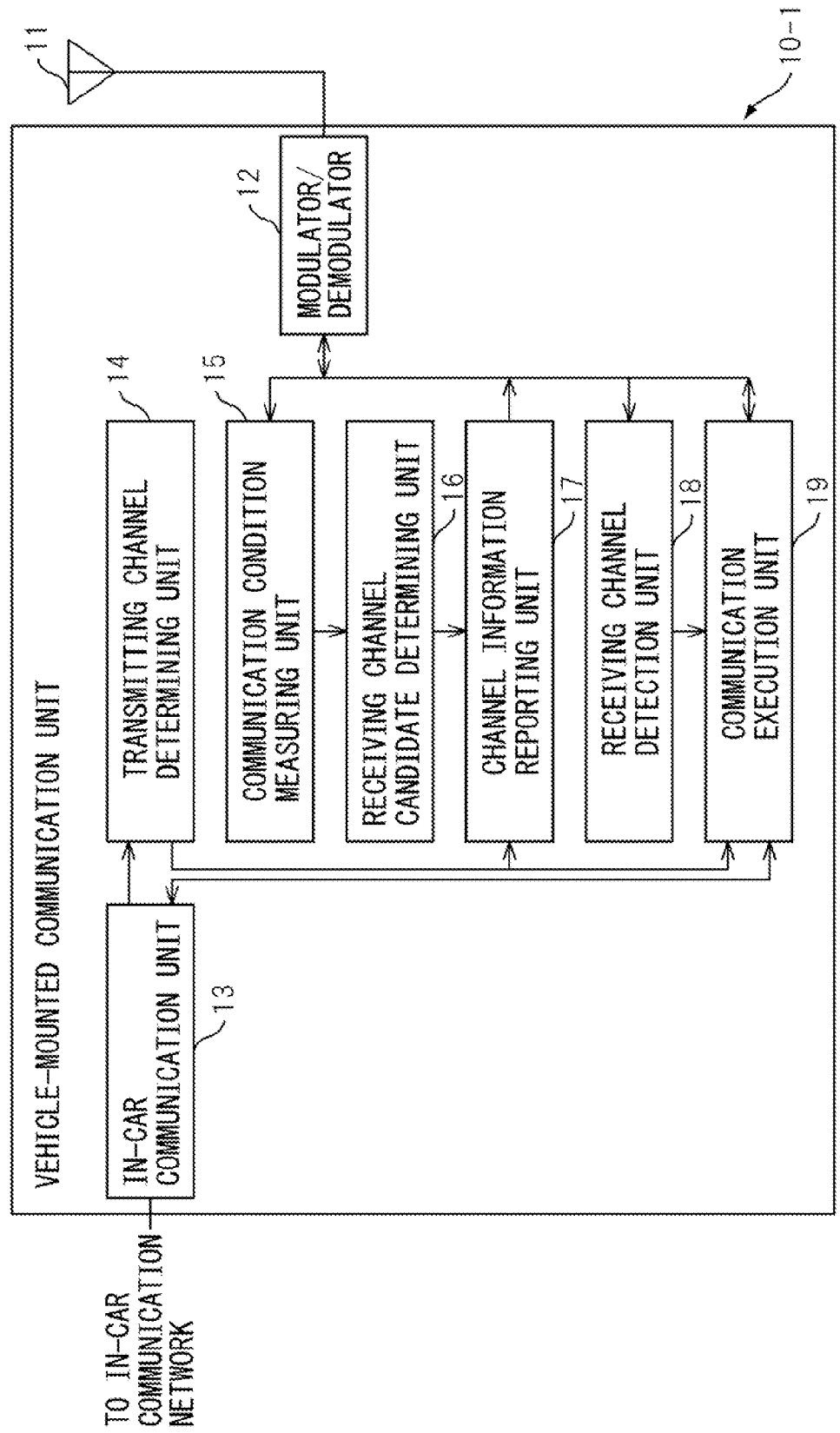
FIG. 2 is a diagram schematically illustrating the configuration of a vehicle-mounted communication unit according to the one embodiment.

FIG. 2 is a diagram schematically illustrating the configuration of the vehicle-mounted communication unit 10-1 as one example of the mobile communication unit. The vehicle-mounted communication units 10-1 to 10-4 can be identical in function and configuration. The following description therefore deals only with the vehicle-mounted communication unit 10-1, and a detailed description of the other vehicle-mounted communication units will not be given herein.

The vehicle-mounted communication unit 10-1 includes an antenna 11, a modulator/demodulator 12, an in-car communication unit 13, a transmitting channel determining unit 14, a communication condition measuring unit 15, a receiving channel candidate determining unit 16, a channel information reporting unit 17, a receiving channel detection unit 18, and a communication execution unit 19.

The modulator/demodulator 12, the in-car communication unit 13, the transmitting channel determining unit 14, the communication condition measuring unit 15, the receiving channel candidate determining unit 16, the channel information reporting unit 17, the receiving channel detection unit 18, and the communication execution unit 19 are each implemented as a separate circuit. Alternatively, these units as circuits may be implemented on a single integrated circuit and mounted in integrated-circuit form on the vehicle-mounted communication unit 10-1.

The antenna 11 is connected to the modulator/demodulator 12. A radio signal received by the antenna 11 from the roadside unit 20 or from another vehicle-mounted communication unit is passed to the modulator/demodulator 12. On the other hand, a radio signal passed from the modulator/demodulator 12 is transmitted out by the antenna 11.

The modulator/demodulator 12 connected to the antenna 12 is also connected to the communication condition measuring unit 15, channel information reporting unit 17, receiving channel detection unit 18, and communication execution unit 19. The modulator/demodulator 12 modulates a signal received from the channel information reporting unit 17 or the communication execution unit 19 in accordance with a prescribed modulation scheme. Then, the modulator/demodulator 12 generates a radio signal by superimposing the modulated signal on a carrier having a radio frequency, and outputs the radio signal onto the antenna 11 for transmission. On the other hand, the radio signal received via the antenna 11 is passed to the modulator/demodulator 12 where the received signal is multiplied with a local oscillation signal having a local oscillation frequency, thereby generating a baseband signal having a baseband frequency. Then, the modulator/demodulator 12 demodulates the baseband signal in accordance with the prescribed modulation scheme. The modulator/demodulator 12 passes the demodulated signal to the communication condition measuring unit 15, the receiving channel detection unit 18, or the communication execution unit 19. The prescribed modulation scheme here is, for example, an orthogonal frequency division multiplexing (OFDM) scheme.

The in-car communication unit 13 includes a communication interface circuit for connecting the vehicle-mounted communication unit 10-1 to an in-car communication network conforming to a communication standard such as Control Area Network (CAN). The in-car communication unit 13 periodically acquires from a position information acquiring apparatus, via the in-car communication network, current position information indicating the current position of the vehicle 2-1 and map information defining a map containing the current position. The position information acquiring apparatus here is, for example, a navigation system equipped with a global positioning system (GPS). The in-car communication unit 13 is connected to the transmitting channel determining unit 14 and the communication execution unit 19. The in-car communication unit 13 passes the acquired current position information and map information to the transmitting channel determining unit 14. The map information includes information indicating a slot designation area, which is set for each time slot that the vehicle-mounted communication unit uses for signal transmission, and the identification number of the time slot corresponding to the slot designation area. The information indicating the slot designation area is, for example, a combination of the radius of the slot designation area and the coordinates of the center of that area or, in the case of a rectangular slot designation area, a combination of the coordinates of two diametrically opposed corners of the slot designation area.

The in-car communication unit 13 receives via the communication execution unit 19 various kinds of information transmitted from the roadside unit 20 or from another vehicle-mounted communication unit. Then, the in-car communication unit 13 transmits the received information another to apparatus connected to the in-car communication network. An example of such other apparatus is an electronic toll collection system (ETC), a driver assistance system, or an information display apparatus mounted on the vehicle.

The transmitting channel determining unit 14 determines, based on the current position of the vehicle 2-1, the transmitting channel, i.e., the time slot, that the vehicle-mounted communication unit 10-1 is to use for signal transmission. For this purpose, the transmitting channel determining unit 14 determines the slot designation area containing the current position of the vehicle 2-1, by referring to the current position information and map information acquired via the in-car communication network. Then, the transmitting channel determining unit 14 determines as the transmitting channel the time slot corresponding to the identification number associated with that slot designation area.

The transmitting channel determining unit 14 passes the identification number of the thus determined transmitting channel to the channel information reporting unit 17 and the communication execution unit 19.

Figure 3:
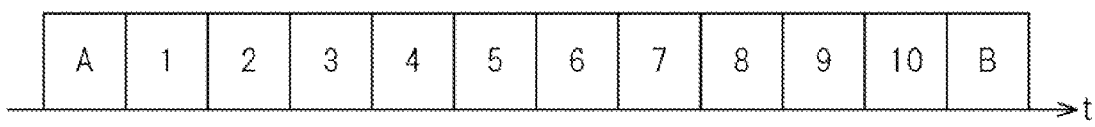
FIG. 3 is a diagram illustrating one example of an arrangement of time slots contained in one frame.

FIG. 3 is a diagram illustrating one example of an arrangement of time slots contained in one frame. In FIG. 3, the horizontal axis represents the time. Each block contained in a block sequence 300 indicates a time slot. Numerals 1 to 10 or symbols A and B indicated within the respective blocks are the identification numbers of the respective time slots. Of these time slots, the time slots 1 to 10 are the time slots that the vehicle-mounted communication unit or the roadside unit uses to transmit information. The time slot A is the time slot that the vehicle-mounted communication unit uses to transmit control information to the roadside unit. The time slot B is the time slot that the roadside unit uses to transmit control information to all the vehicle-mounted communication units located within the communication range of the roadside unit.

Figure 4:
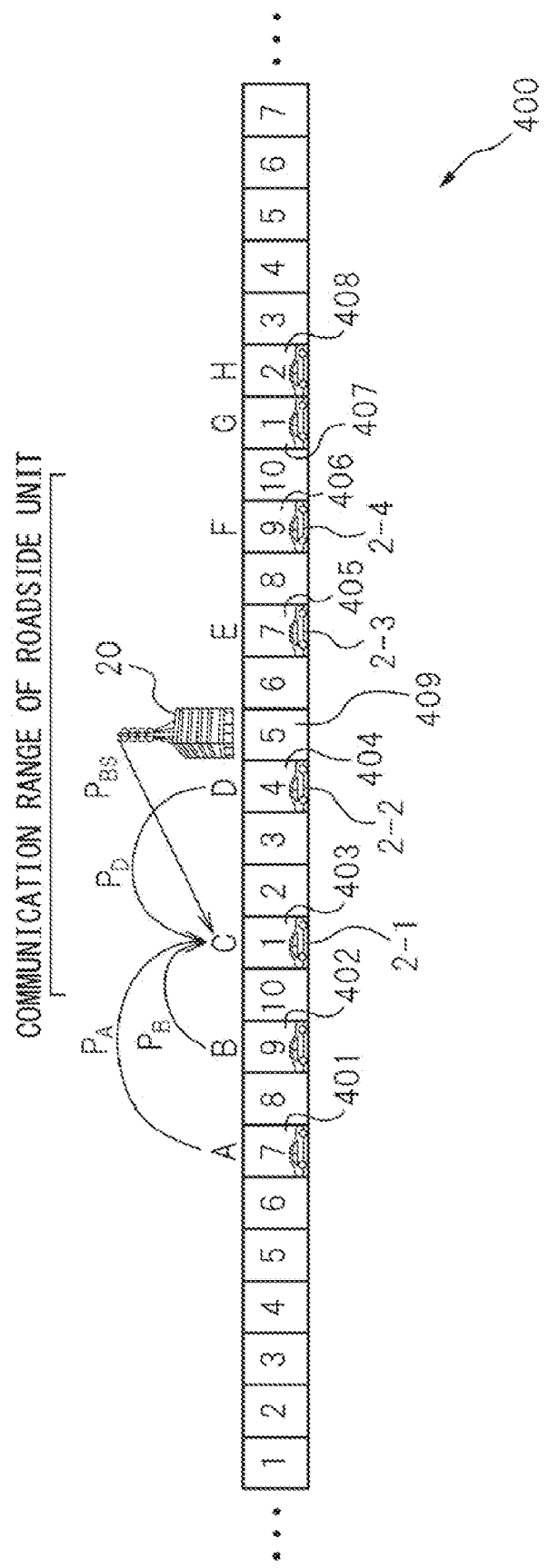
FIG. 4 is a conceptual diagram illustrating the positional relationship between each time slot and vehicle.

FIG. 4 is a conceptual diagram illustrating the positional relationship between each time slot and vehicle. In FIG. 4, each block contained in a block sequence 400 indicates a slot designation area to which one time slot is allocated. The numeral indicated within each block indicates the identification number of the time slot. Symbols A to H indicated alongside the blocks 401 to 408 in the block sequence 400 represent the identification numbers of the vehicle-mounted communication units mounted on the vehicles located in the slot designation areas corresponding to the respective blocks 401 to 408. For example, it is seen that the vehicle 2-1 is located in the slot designation area corresponding to the block 403. That is, the vehicle-mounted communication unit 10-1 mounted on the vehicle 2-1 is located in this area. In the illustrated example, the identification number of the vehicle-mounted communication unit 10-1 is C. It is also seen that the vehicle 2-2 is located in the slot designation area corresponding to the block 404. That is, the vehicle-mounted communication unit 10-2 mounted on the vehicle 2-2 is located in this area. In the illustrated example, the identification number of the vehicle-mounted communication unit 10-2 is D. Similarly, the vehicles 2-3 and 2-4 are respectively located in the slot designation areas corresponding to the blocks 405 and 406. That is, the vehicle-mounted communication units 10-3 and 10-4 mounted on the respective vehicles 2-3 and 2-4 are located in the respective regions. In the illustrated example, the identification numbers of the vehicle-mounted communication units 10-3 and 10-4 are E and F, respectively. On the other hand, the roadside unit 20 is installed in the slot designation area corresponding to the block 409. It is assumed here that any particular vehicle-mounted communication unit and the roadside unit 20 are each capable of communicating with any vehicle-mounted communication unit located, for example, within five blocks of the slot designation area containing that particular vehicle-mounted communication unit or the roadside unit. In the illustrated example, the roadside unit 20 is capable of communicating with the vehicle-mounted communication units C, D, E, and F. Likewise, the vehicle-mounted communication unit C located in the slot designation area corresponding to the block 403 is capable of communicating with the vehicle-mounted communication units A, B, and D as well as the roadside unit 20. Since the time slot allocated to the slot designation area containing the vehicle-mounted communication unit C is the time slot 1, the transmitting channel determining unit 14 in the vehicle-mounted communication unit C selects the time slot 1 as the transmitting channel.

However, the vehicle-mounted communication unit C is unable to detect that the vehicle-mounted communication units E and F are located within the communication range of the roadside unit 20. It is therefore preferable for the roadside unit 20 to determine the time slot that each of the vehicle-mounted communication units C, E, and F is to use to receive a radio signal transmitted from the roadside unit 20.

Based on the strength of the radio signal received from the roadside unit and the strength of radio signals received from other communication units including other vehicle-mounted communication units, the communication condition measuring unit 15 obtains a reception condition measurement representing the reception condition of the radio signal received from the roadside unit 20 in each time slot. For this purpose, the communication condition measuring unit 15 includes a memory circuit (not illustrated) for storing the radio signal received from the roadside unit 20 and the radio signals received from other communication units in each time slot. Then, the communication condition measuring unit 15 obtains the reception condition measurement by referring to the strengths of the radio signals stored in the memory circuit.

For example, the communication condition measuring unit 15 obtains the reception condition measurement by calculating, for each time slot, the signal to interference plus noise ratio (SINR) in accordance with the following equation.

$$SINR_t = \frac{P_{BS}}{N + P_t} \quad (1)$$

$SINR_t$ represents the SINR in time slot t. $P_{BS}$ is the power of the signal that the modulator/demodulator 12 produced by demodulating the radio signal received from the roadside unit 20. $P_{BS}$ may be represented, for example, by the average strength of the preamble signal contained in the radio signal received from the roadside unit 20. The preamble signal is a signal inserted at the beginning of each time slot in each frame. The preamble signal is a signal having, for example, a predetermined length and in which signal values 1s and 0s are arranged in a predetermined rule. On the other hand, N represents noise, and $P_t$ represents the power of the signals that the modulator/demodulator 12 produced by demodulating the radio signals received from other communication units in time slot t. $P_t$ may be represented, for example, by the average power of the radio signals received in the corresponding time slots in one to several past frames.

The communication condition measuring unit 15 may obtain the reception condition measurement by calculating, for each time slot, the carrier to interference plus noise ratio (CINR) rather than the SINR. In this case, the communication condition measuring unit 15 obtains the strengths of the radio signals before demodulation from the modulator/demodulator 12, and calculates the CINR based on the strengths of the radio signals.

In this way, by considering not only the strength of the radio signal received from the roadside unit 20 but also the strength of the radio signals received from other communication units, the communication condition measuring unit 15 measures the reception condition of the radio signal received from the roadside unit 20 in each time slot. As a result, the communication condition measuring unit 15 can accurately measure the reception condition for each time slot even when other communication units are located within the signal reception range of the vehicle-mounted communication unit 10-1.

Further, provisions may be made so that the radio signal to be output from the roadside unit 20 contains a preamble signal but the radio signal to be output from each vehicle-mounted communication unit does not contain a preamble signal. Alternatively, the radio signal to be output from each vehicle-mounted communication unit may contain a preamble signal that is different from the preamble signal contained in the radio signal to be output from the roadside unit 20. With these provisions, the communication condition measuring unit 15 can identify whether the received radio signal is one that is output from the roadside unit 20 or one that is output from some other communication unit.

The communication condition measuring unit 15 reports the reception condition measurement of each time slot to the receiving channel candidate determining unit 16 together with the identification number of the corresponding time slot.

Based on the reception condition measurements of the respective time slots received from the communication condition measuring unit 15, the receiving channel candidate determining unit 16 determines candidate channels, i.e., candidates for the time slot that the vehicle-mounted communication unit 10-1 is to use to receive a signal from the roadside unit 20. For example, the receiving channel candidate determining unit 16 determines the candidate channels by selecting a predetermined number of time slots in order of decreasing reception condition, i.e., in order of decreasing SINR or CINR. The predetermined number here is an integer not smaller than 1 but not larger than the number of time slots that the roadside unit 20 can use to transmit signals to the vehicle-mounted communication unit.

The receiving channel candidate determining unit 16 reports the identification numbers of the candidate channels to the channel information reporting unit 17. Here, the receiving channel candidate determining unit 16 may report not only the identification numbers of the candidate channels but also the reception condition measurements of the candidate channels to the channel information reporting unit 17.

Further, the receiving channel candidate determining unit 16 may assign priorities to the candidate channels. For example, the receiving channel candidate determining unit 16 assigns higher priorities to candidate channels having higher SINR or CINR. Then, the receiving channel candidate determining unit 16 reports the priorities to the channel information reporting unit 17 together with the identification numbers of the candidate channels.

The channel information reporting unit 17 transmits the identification numbers of the candidate channels and candidate channel information as information concerning the candidate channels to the roadside unit 20. The identification numbers of the candidate channels are included in the candidate channel information. For this purpose, the channel information reporting unit 17 creates a reporting signal by including therein the identification number of the transmitting channel, the identification numbers of the candidate channels, and the identification number of the vehicle-mounted communication unit 10-1 or the vehicle 2-1 in which the communication unit 10-1 is mounted. If the channel information reporting unit 17 has also received the reception condition measurements of the candidate channels, the candidate channel information also includes the reception condition measurements of the candidate channels. If the candidate channels are assigned priorities, the candidate channel information also includes the priorities of the candidate channels. The channel information reporting unit 17 passes the reporting signal to the modulator/demodulator 12 so that the reporting signal will be transmitted using the time slot preassigned to the vehicle-mounted communication unit to transmit the control information to the roadside unit 20.

Alternatively, the channel information reporting unit 17 may pass the reporting signal to the modulator/demodulator 12 so that the reporting signal will be transmitted using the transmitting channel. In this case, it is not necessary that the identification number of the transmitting channel be included in the reporting signal.

The receiving channel detection unit 18 detects from the reporting signal received from the roadside unit 20 the receiving channel or the time slot that the vehicle-mounted communication unit 10-1 is to use to receive a signal from the roadside unit 20. For this purpose, based on the reference clock signal generated by the internal clock (not illustrated) of the vehicle-mounted communication unit 10-1, the receiving channel detection unit 18 extracts, for example, from the signal received from the modulator/demodulator 12, the reporting signal carried in the time slot preassigned to the roadside unit 20 to transmit the control information to each vehicle-mounted communication unit. From this reporting signal, the receiving channel detection unit 18 detects the identification number of the time slot associated with the identification number of the vehicle-mounted communication unit 10-1 or the vehicle 2-1. Then, the receiving channel detection unit 18 determines as the receiving channel the time slot specified by the detected identification number.

The receiving channel detection unit 18 reports the identification number of the receiving channel to the communication execution unit 19.

The communication execution unit 19 performs communication with the roadside unit 20 by using the thus determined transmitting and receiving channels. For this purpose, the communication execution unit 19 includes a memory circuit (not illustrated) for storing the identification number of the transmitting channel and the identification number of the receiving channel. The communication execution unit 19 creates a transmit signal containing the information to be transmitted, and applies a coding operation such as error-correction coding to the transmit signal. The communication execution unit 19 passes the transmit signal to the modulator/demodulator 12 so that the transmit signal will be transmitted using the transmitting channel, based on the identification number of the transmitting channel stored in the memory circuit and the reference clock signal generated by the internal clock (not illustrated) of the vehicle-mounted communication unit 10-1. Further, the communication execution unit 19 identifies the receiving channel based on the reference clock signal and the identification number of the receiving channel stored in the memory circuit and, by applying a decoding operation such as error-correction decoding to the received signal extracted from the receiving channel, reproduces the information received from the roadside unit 20. Then, the communication execution unit 19 transmits the reproduced information via the in-car communication unit 13 to the apparatus, such as a navigation system, an ETC, or a driver assistance system, that uses the information received from the roadside unit 20.

The communication execution unit 19 may transmit signals to other vehicle-mounted communication units by using the transmitting channel. Further, the communication execution unit 19 may receive information transmitted from some other vehicle-mounted communication unit and reproduce the information by applying a decoding operation such as error-correction decoding to the received signal extracted from a receiving channel other than the above receiving channel or transmitting channel.

Figure 5:
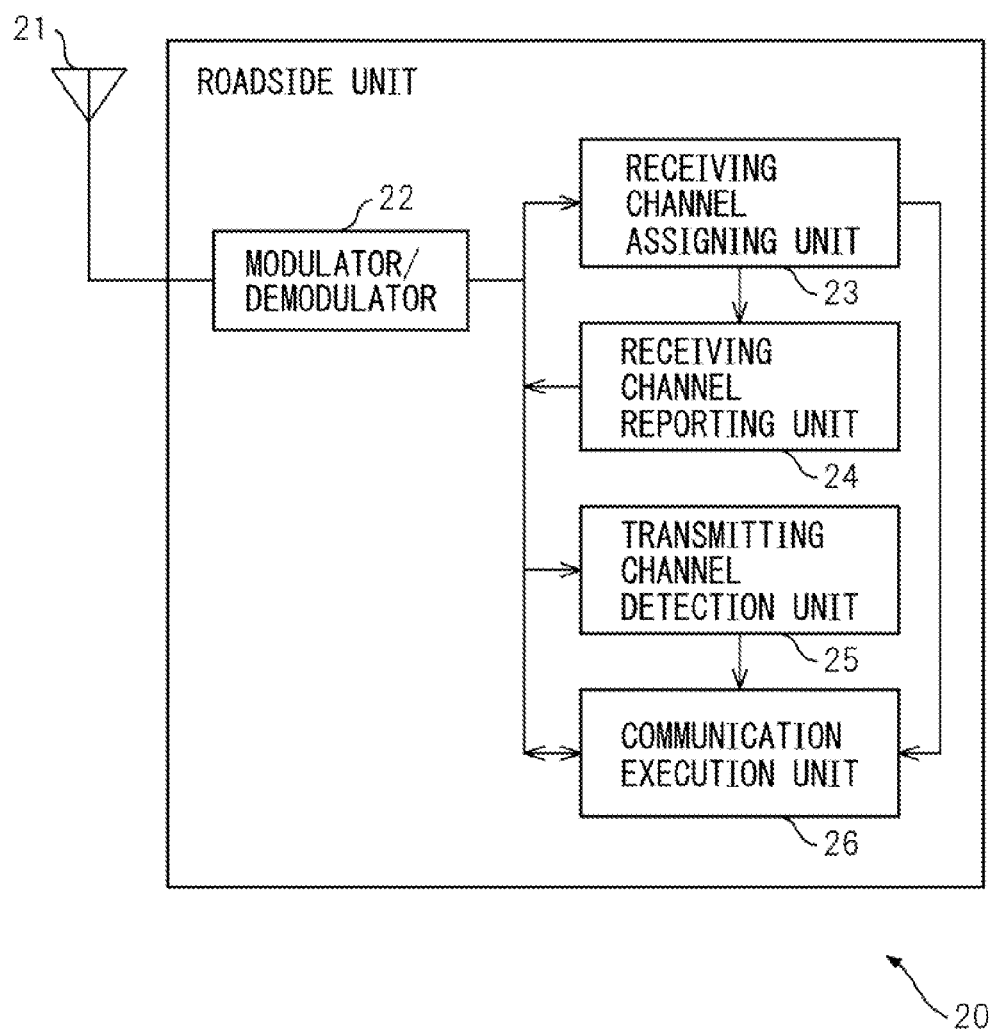
FIG. 5 is a diagram schematically illustrating the configuration of a roadside unit according to the one embodiment.

FIG. 5 is a diagram schematically illustrating the configuration of the roadside unit 20. As illustrated in FIG. 5, the roadside unit 20 includes an antenna 21, a modulator/demodulator 22, a receiving channel assigning unit 23, a receiving channel reporting unit 24, a transmitting channel detection unit 25, and a communication execution unit 26.

The modulator/demodulator 22, the receiving channel assigning unit 23, the receiving channel reporting unit 24, the transmitting channel detection unit 25, and the communication execution unit 26 are each implemented as a separate circuit. Alternatively, these units as circuits may be implemented on a single integrated circuit and mounted in integrated-circuit form on the roadside unit 20.

The antenna 21 is connected to the modulator/demodulator 22. A radio signal received by the antenna 21 from any given vehicle-mounted communication unit is passed to the modulator/demodulator 22. On the other hand, a radio signal passed from the modulator/demodulator 22 is transmitted out by the antenna 21.

The modulator/demodulator 22 is connected to the other units contained in the roadside unit 20. The modulator/demodulator 22 modulates a signal received from the receiving channel reporting unit 24 or the communication execution unit 26 in accordance with a prescribed modulation scheme. Then, the modulator/demodulator 22 generates a radio signal by superimposing the modulated signal on a carrier having a radio frequency, and outputs the radio signal onto the antenna 21 for transmission. On the other hand, the radio signal received via the antenna 21 is demodulated by the modulator/demodulator 22 in accordance with the prescribed modulation scheme. The modulator/demodulator 22 passes the demodulated signal to the receiving channel assigning unit 23, the transmitting channel detection unit 25, or the communication execution unit 26. The prescribed modulation scheme here is the same modulation scheme as that employed in the vehicle-mounted communication unit for signal transmission and reception, for example, OFDM.

The receiving channel assigning unit 23 determines, from among the candidate channels reported from each vehicle-mounted communication unit, the receiving channel or the time slot that the vehicle-mounted communication unit is to use to receive the radio signal transmitted from the roadside unit 20.

When the reporting signal is received from only one vehicle-mounted communication unit, the receiving channel assigning unit 23 selects one suitable identification number from among the candidate channel identification numbers carried in the reporting signal. Then, the receiving channel assigning unit 23 assigns the candidate channel corresponding to the selected identification number for use as the receiving channel. If the reporting signal carries the reception condition measurements of the respective candidate channels, the receiving channel assigning unit 23 may select one or more candidate channels in order of decreasing reception condition by referring to the reception condition measurements and assign the selected one or more candidate channels as the receiving channels. If the reporting signal carries the priorities of the candidate channels, the receiving channel assigning unit 23 may select one or more candidate channels in priority order and assign the selected one or more candidate channels as the receiving channels.

On the other hand, when reporting signals are received from a plurality of vehicle-mounted communication units, the receiving channel assigning unit 23 determines the receiving channels for the respective vehicle-mounted communication units in accordance with a predetermined rule.

As an example, if the reporting signals carry the reception condition measurements of the candidate channels, the receiving channel assigning unit 23 refers to the reception condition measurements and identifies the candidate channel having the best reception condition. Then, the receiving channel assigning unit 23 assigns the candidate channel having the best reception condition as the receiving channel for the vehicle-mounted communication unit that reported that candidate channel.

Next, the receiving channel assigning unit 23 refers to the reception condition measurements of the unused candidate channels that are carried in other reporting signals than the reporting signal received from the vehicle-mounted communication unit for which the receiving channel has been determined, and that are not yet assigned for use as receiving channels. The receiving channel assigning unit 23 selects, from among the unused candidate channels, the unused candidate channel having the best reception condition and assigns it as the receiving channel for the vehicle-mounted communication unit that reported that candidate channel. By repeating the above process, the receiving channel assigning unit 23 sequentially determines the receiving channels for the respective vehicle-mounted communication units. In this way, for the plurality of vehicle-mounted communication units wishing to communicate simultaneously, the receiving channel assigning unit 23 can assign the receiving channels in order of decreasing reception condition, starting with the vehicle-mounted communication unit having the best reception condition. Since this serves to reduce the possibility of loss of the transmit signal during transmission, the roadside unit 20 can enhance the throughput of the transmit signal.

Figure 6:
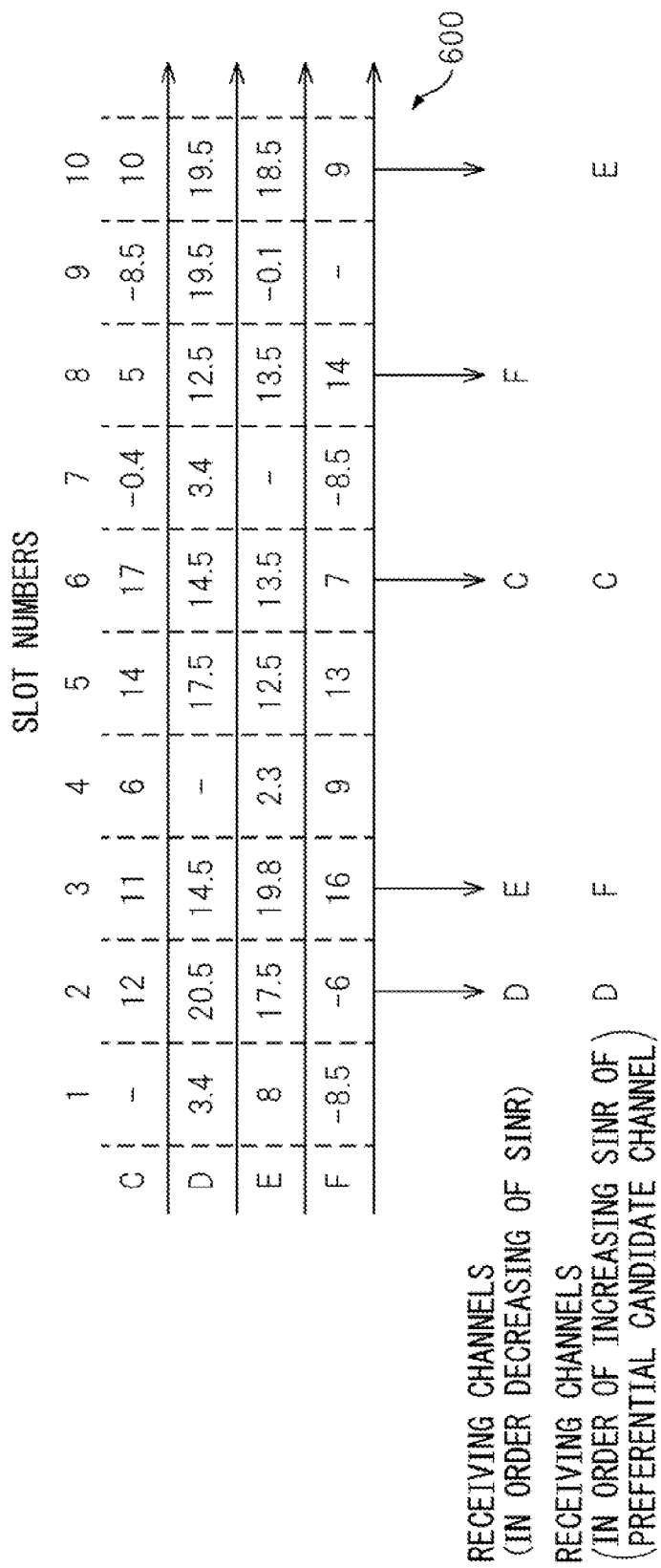
FIG. 6 is a diagram illustrating a relationship table between the SINRs of candidate channels and the receiving channels assigned to the respective vehicle-mounted communication units.

FIG. 6 is a diagram illustrating a relationship table between the SINRs of the candidate channels and the receiving channels assigned to the respective vehicle-mounted communication units for the case where the roadside unit and the vehicle-mounted communication units are located as depicted in FIG. 4. In the table 600 of FIG. 6, symbols C, D, E, and F in the leftmost column represent the identification numbers of the vehicle-mounted communication units located within the communication range of the roadside unit. Numbers 1 to 10 in the top row are the identification numbers of the time slots representing the candidate channels reported from the vehicle-mounted communication units. The numerical value in each entry indicates the SINR (dB) of the time slot designated in the top row at the column corresponding to that entry for the vehicle-mounted communication unit designated in the leftmost column at the row corresponding to that entry. Each entry carrying no numerical value indicates that the corresponding time slot is assigned as the transmitting channel for the vehicle-mounted communication unit designated in the leftmost column at the row corresponding to that entry.

In the table 600, the SINR of the time slot 2 for the vehicle-mounted communication unit D is the highest. Therefore, the receiving channel assigning unit 23 assigns the time slot 2 as the receiving channel for the vehicle-mounted communication unit D.

Next, among the vehicle-mounted communication units C, E, and F, the SINR of the time slot 3 for the vehicle-mounted communication unit E is the highest. Therefore, the receiving channel assigning unit 23 assigns the time slot 3 as the receiving channel for the vehicle-mounted communication unit E.

Next, between the vehicle-mounted communication units C and F for which the receiving channels are not yet determined, the SINR of the time slot 6 for the vehicle-mounted communication unit C is the highest. Therefore, the receiving channel assigning unit 23 assigns the time slot 6 as the receiving channel for the vehicle-mounted communication unit C.

For the remaining vehicle-mounted communication unit F, the SINR of the time slot 3 is the highest. However, the time slot 3 has already been assigned as the receiving channel for the vehicle-mounted communication unit E. Therefore, the receiving channel assigning unit 23 assigns the time slot 8 having the next highest SINR as the receiving channel for the vehicle-mounted communication unit F.

Here, the receiving channel assigning unit 23 may assign more than one receiving channel to one vehicle-mounted communication unit. For example, the receiving channel assigning unit 23 may take the time slots 5 and 10 neither of which is assigned as the transmitting channel or the receiving channel for any one of the vehicle-mounted communication units, and assign them as the receiving channels for the vehicle-mounted communication unit D having the highest SINR in the respective time slots.

As another example, if the reporting signals carry the reception condition measurements of the candidate channels, the receiving channel assigning unit 23 identifies the candidate channel having the best reception condition as a preferential candidate channel for each vehicle-mounted communication unit that transmitted the reporting signal. Then, from among the thus identified preferential candidate channels, the receiving channel assigning unit 23 selects the preferential candidate channel having the worst reception condition, and assigns it as the receiving channel for the vehicle-mounted communication unit corresponding to that preferential candidate channel.

Next, for each of the other vehicle-mounted communication units that transmitted the respective reporting signals and for which the receiving channels are not yet determined, the receiving channel assigning unit 23 identifies a preferential candidate channel once again, this time by excluding the preferential candidate channel that has already been assigned for use as the receiving channel. Then, from among the thus identified preferential candidate channels, the receiving channel assigning unit 23 selects the preferential candidate channel having the worst reception condition, and assigns it as the receiving channel for the vehicle-mounted communication unit corresponding to that preferential candidate channel. By repeating the above process, the receiving channel assigning unit 23 sequentially determines the receiving channels for the respective vehicle-mounted communication units. In this way, for the plurality of vehicle-mounted communication units wishing to communicate simultaneously, the receiving channel assigning unit 23 can assign the receiving channels in order of increasing reception condition, starting with the vehicle-mounted communication unit having the worst reception condition. As a result, for all the vehicle-mounted communication units wishing to communicate simultaneously, the roadside unit 20 can prevent the signal to be transmitted from the roadside unit 20 from suffering loss during transmission.

Referring again to the table 600 of FIG. 6, for the respective vehicle-mounted communication units C, D, E, and F, the time slots having the highest SINR are 6, 2, 3, and 3, respectively. Therefore, the time slots 6, 2, 3, and 3 are identified as the preferential candidate channels for the respective vehicle-mounted communication units C, D, E, and F. Of these preferential candidate channels, the time slot 3 as the preferential candidate channel for the vehicle-mounted communication unit F has the lowest SINR. Therefore, the receiving channel assigning unit 23 assigns the time slot 3 as the receiving channel for the vehicle-mounted communication unit F. The time slot 3 is also the preferential candidate channel for the vehicle-mounted communication unit E. Therefore, the receiving channel assigning unit 23 changes the preferential candidate channel for the vehicle-mounted communication unit E to the time slot 10 having the highest SINR next to the time slot 3.

Next, among the preferential candidate channels for the vehicle-mounted communication units C, D, and E, the time slot 6 as the preferential candidate channel for the vehicle-mounted communication unit C has the lowest SINR. Therefore, the receiving channel assigning unit 23 assigns the time slot 6 as the receiving channel for the vehicle-mounted communication unit C.

Next, between the preferential candidate channels for the vehicle-mounted communication units D and E for which the receiving channels are not yet determined, the SINR of the time slot 10 as the preferential candidate channel for the vehicle-mounted communication unit E is lower than the SINR of the time slot 2 as the preferential candidate channel for the vehicle-mounted communication unit D. Therefore, the receiving channel assigning unit 23 assigns the time slot 10 as the receiving channel for the vehicle-mounted communication unit E.

Finally, the receiving channel assigning unit 23 assigns as the receiving channel for the vehicle-mounted communication unit D the time slot 2 identified as the preferential candidate channel for the vehicle-mounted communication unit D.

The receiving channel assigning unit 23 may assign more than one receiving channel to one vehicle-mounted communication unit. For example, the receiving channel assigning unit 23 may take the time slots 5 and 8 neither of which is assigned as the transmitting channel or the receiving channel for any one of the vehicle-mounted communication units, and assign them as the receiving channels for the vehicle-mounted communication unit F that has been assigned the receiving channel having the lowest SINR.

As a further example, for each of the plurality of vehicle-mounted communication units wishing to communicate simultaneously, the receiving channel assigning unit 23 may assign the receiving channel so that the instantaneous throughput of the vehicle-mounted communication unit is not lower than a predetermined value. In this case also, the reporting signal has to carry the reception condition measurements of the candidate channels.

The receiving channel assigning unit 23 calculates the instantaneous throughput (bps/Hz) for each candidate channel in accordance with the following equation.

$$\text{InstThr} = (1 - \text{PER(SINR)}) Eb \quad (2)$$

Here, InstThr denotes the instantaneous throughput, and PER (SINR) represents the packet error rate when the value of the signal power to noise plus interference power ratio is the SINR. Eb is the maximum instantaneous throughput (bps/Hz). The value of PER(SINR) for each SINR value may be theoretically or experimentally obtained in advance, and the values may be stored in the form of a SINR-to-PER(SINR) mapping table in the memory circuit maintained in the receiving channel assigning unit 23. Likewise, Eb may also be theoretically or experimentally obtained in advance and stored in the memory circuit maintained in the receiving channel assigning unit 23.

For each vehicle-mounted communication unit, the receiving channel assigning unit 23 selects as the receiving channel the candidate channel whose InstThr calculated in accordance with equation (2) for that vehicle-mounted communication unit is equal to or higher than the predetermined value. In this case, the receiving channel assigning unit 23 may sequentially determine the receiving channels, starting with the vehicle-mounted communication unit corresponding to the candidate channel having the highest InstThr, in a manner similar to the earlier described example. Alternatively, the receiving channel assigning unit 23 may determine the preferential candidate channel for each vehicle-mounted communication unit by selecting the candidate channel having the highest InstThr, and may sequentially determine the receiving channels, starting with the vehicle-mounted communication unit corresponding to the preferential candidate channel having the lowest InstThr of all the preferential candidate channels.

Further, the receiving channel assigning unit 23 may assign a plurality of receiving channels to a vehicle-mounted communication unit where the InstThr of any one of the candidate channels is lower than the predetermined value. In this case, it is preferable that the sum of the InstThr values of the plurality of receiving channels becomes equal to or higher than the predetermined value. In this way, the receiving channel assigning unit 23 can ensure a given degree of communication quality for all the vehicle-mounted communication units wishing to communicate simultaneously. As a result, for all the vehicle-mounted communication units wishing to communicate simultaneously, the roadside unit 20 can prevent the signal to be transmitted from the roadside unit 20 from suffering loss during transmission.

Figure 7:
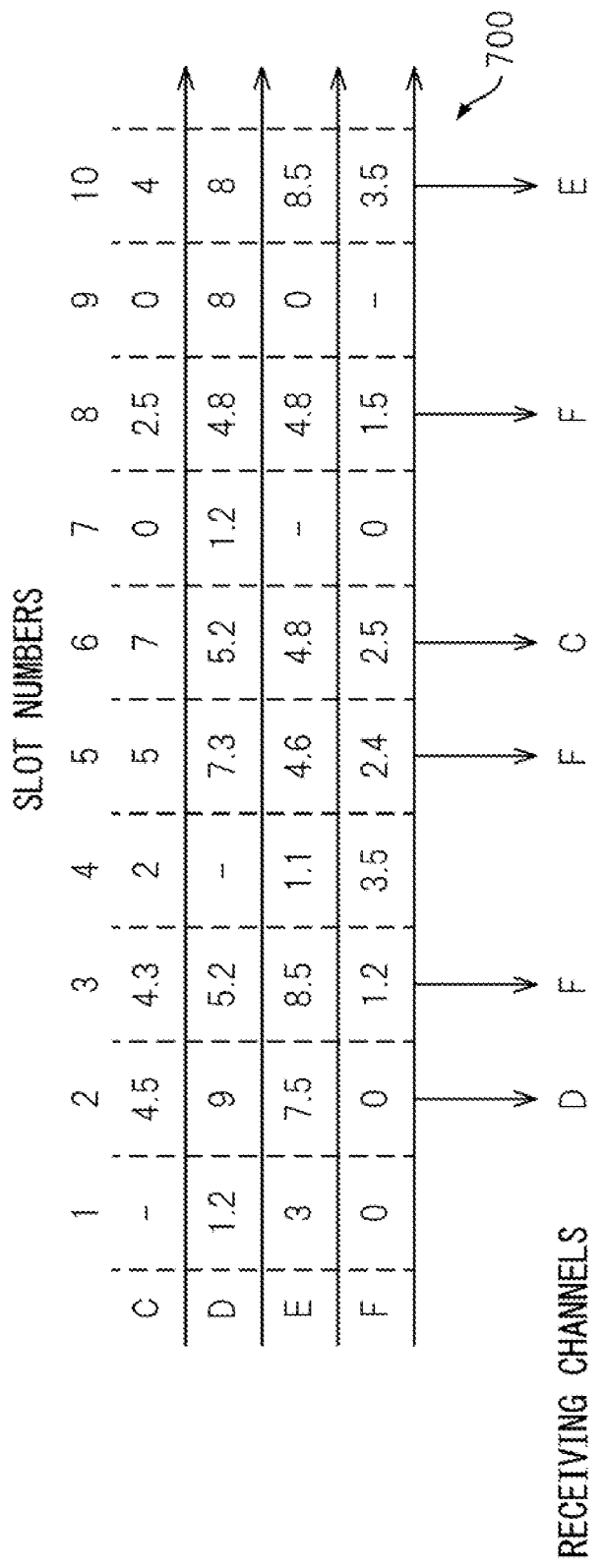
FIG. 7 is a diagram illustrating the relationship between the instantaneous throughputs of candidate channels and the receiving channels assigned to the respective vehicle-mounted communication units.

FIG. 7 is a diagram illustrating a relationship table between the instantaneous throughputs of the candidate channels and the receiving channels assigned to the respective vehicle-mounted communication units for the case where the roadside unit and the vehicle-mounted communication units are located as depicted in FIG. 4. In the table 700 of FIG. 7, symbols C, D, E, and F in the leftmost column represent the identification numbers of the vehicle-mounted communication units wishing to communicate with the roadside unit. Numbers 1 to 10 in the top row are the identification numbers of the time slots representing the candidate channels reported from the vehicle-mounted communication units. The numerical value in each entry indicates the InstThr of the time slot designated in the top row at the column corresponding to that entry for the vehicle-mounted communication unit designated in the leftmost column at the row corresponding to that entry. Each entry carrying no numerical value indicates that the corresponding time slot is assigned as the transmitting channel for the vehicle-mounted communication unit designated in the leftmost column at the row corresponding to that entry. The predetermined value based on which to select the receiving channel is set, for example, to 5 bps/Hz.

In the table 700, the InstThr of the time slot 2 for the vehicle-mounted communication unit D is the highest, and the value of the InstThr is higher than the predetermined value. Therefore, the receiving channel assigning unit 23 assigns the time slot 2 as the receiving channel for the vehicle-mounted communication unit D.

Next, among the vehicle-mounted communication units C, E, and F, the InstThr of the time slot 3 or 10 for the vehicle-mounted communication unit E is the highest, and the value of the InstThr is higher than the predetermined value. Therefore, the receiving channel assigning unit 23 assigns either one of the time slots 3 and 10 as the receiving channel for the vehicle-mounted communication unit E. In the illustrated example, the time slot 10 is assigned as the receiving channel for the vehicle-mounted communication unit E.

Next, between the vehicle-mounted communication units C and F for which the receiving channels are not yet determined, the InstThr of the time slot 6 for the vehicle-mounted communication unit C is the highest, and the value of the InstThr is higher than the predetermined value. Therefore, the receiving channel assigning unit 23 assigns the time slot 6 as the receiving channel for the vehicle-mounted communication unit C.

For the remaining vehicle-mounted communication unit F, the InstThr of any one of the time slots 3, 5, and 8, none of which is assigned as the transmitting channel or the receiving channel for any one of the vehicle-mounted communication units, is lower than the predetermined value. Therefore, the receiving channel assigning unit 23 selects a plurality of receiving channels so that the sum of the InstThr values of the receiving channels selected for the vehicle-mounted communication unit F does not become lower than the predetermined value. In the illustrated example, the receiving channel assigning unit 23 assigns the time slots 3, 5, and 8 as the receiving channels for the vehicle-mounted communication unit F.

As another example, priorities are preassigned to the transmitting channels reported from the respective vehicle-mounted communication units, i.e., to the slot designation areas where the respective vehicle-mounted communication units are located. In this case, the receiving channel assigning unit 23 refers to the identification numbers of the transmitting channels reported from the respective vehicle-mounted communication units, and determines the order in which to assign the receiving channels in accordance with the priorities preassigned to the transmitting channels. Then, starting with the vehicle-mounted communication unit having the highest priority, the receiving channel assigning unit 23 sequentially assigns the receiving channel to each vehicle-mounted communication unit by selecting, from among the candidate channels reported from that vehicle-mounted communication unit, a candidate channel that is not assigned as the transmitting channel nor as the receiving channel for any one of the vehicle-mounted communication units.

In this way, the receiving channel assigning unit 23 can prevent the signal to be transmitted from the roadside unit 20 from suffering loss during transmission to the vehicle-mounted communication unit to which the signal needs to be transmitted reliably from the roadside unit 20 according to the location of the vehicle.

The receiving channel assigning unit 23 passes the identification number of the receiving channel assigned to each vehicle-mounted communication unit and the identification number of the corresponding vehicle-mounted communication unit or vehicle to the receiving channel reporting unit 24 and the communication execution unit 26.

The receiving channel reporting unit 24 reports the identification number of the receiving channel assigned to each vehicle-mounted communication unit to the corresponding vehicle-mounted communication unit. For this purpose, the receiving channel reporting unit 24 creates a reporting signal by including therein the identification number of the receiving channel and the identification number of the vehicle-mounted communication unit or vehicle assigned that receiving channel. Then, the receiving channel reporting unit 24 passes the reporting signal to the modulator/demodulator 22 so that the reporting signal will be transmitted using the time slot preassigned to the roadside unit 20 to transmit the control information to each vehicle-mounted communication unit located within the communication range of the roadside unit 20.

The transmitting channel detection unit 25 detects from the signal received from each vehicle-mounted communication unit the transmitting channel or the time slot that the vehicle-mounted communication unit is to use to transmit a signal to the roadside unit 20. For this purpose, based on the reference clock signal generated by the internal clock (not illustrated) of the roadside unit 20, the transmitting channel detection unit 25 extracts, for example, from the signal received from the modulator/demodulator 22, the reporting signal carried in the time slot preassigned to the vehicle-mounted communication unit to transmit the control information to the roadside unit 20. From this reporting signal, the transmitting channel detection unit 25 detects the identification number of the time slot associated as the transmitting slot with the identification number of the vehicle-mounted communication unit or vehicle. Then, the transmitting channel detection unit 25 detects the time slot specified by the detected time slot identification number and determines it as the transmitting channel for the vehicle-mounted communication unit specified by the identification number of the vehicle-mounted communication unit or vehicle associated with the identification number of that time slot.

Alternatively, if the reporting signal is carried in the transmitting channel, the transmitting channel detection unit 25 extracts the reporting signal from the signal received in the corresponding time slot. Then, the transmitting channel detection unit 25 determines the time slot that carried the extracted reporting signal as the transmitting channel for the vehicle-mounted communication unit specified by the identification number of the vehicle-mounted communication unit or vehicle carried in that reporting signal.

The transmitting channel detection unit 25 reports the identification number of the transmitting channel and the identification number of the corresponding vehicle-mounted communication unit or vehicle to the communication execution unit 26.

The communication execution unit 26 performs communication with one or more vehicle-mounted communication units by using the thus determined transmitting and receiving channels. For this purpose, the communication execution unit 26 includes a memory circuit (not illustrated) for storing the identification number of the transmitting channel and the identification number of the receiving channel for each vehicle-mounted communication unit located within the communication range of the roadside unit 20. When the communication execution unit 26 is unable to extract radio signals from the transmitting channel continuously for a predetermined number of frames which is not smaller than 1, it may be determined that the vehicle-mounted communication unit corresponding to that transmitting channel has moved outside the communication range. In this case, the communication execution unit 26 deletes from its internal memory circuit the identification numbers of the transmitting channel and receiving channel for the vehicle-mounted communication unit determined to have moved outside the communication range.

The communication execution unit 26 extracts the received signal from the transmitting channel identified based on the identification number of the transmitting channel stored in the memory circuit and the reference clock signal generated by the internal clock (not illustrated) of the roadside unit 20. Then, by applying a decoding operation such as error-correction decoding to the thus extracted received signal, the communication execution unit 26 reproduces the information received from the vehicle-mounted communication unit. Further, the communication execution unit 26 creates a transmit signal by including therein the information to be transmitted, such as the reproduced information, so that the reproduced information will be transferred, for example, to another vehicle-mounted communication unit. Then, the communication execution unit 26 applies a coding operation such as error-correction coding to the transmit signal. The communication execution unit 26 then passes the transmit signal to the modulator/demodulator 22 so that, based on the reference clock signal and the identification number of the receiving channel stored in the memory circuit, the transmit signal to the designated vehicle-mounted communication unit will be transmitted using the receiving channel assigned to that vehicle-mounted communication unit.

The roadside unit 20 may include an interface circuit for connecting the roadside unit 20 to a core network so that it can communicate with other apparatus via the core network. Then, from such other apparatus connected via the interface circuit and the core network, the roadside unit 20 may acquire information to be transmitted to each vehicle-mounted communication unit, and may pass the information to the communication execution unit 26. Further, the roadside unit 20 may transmit information received from each vehicle-mounted communication unit to such other apparatus connected via the interface circuit and the core network.

Figure 8:
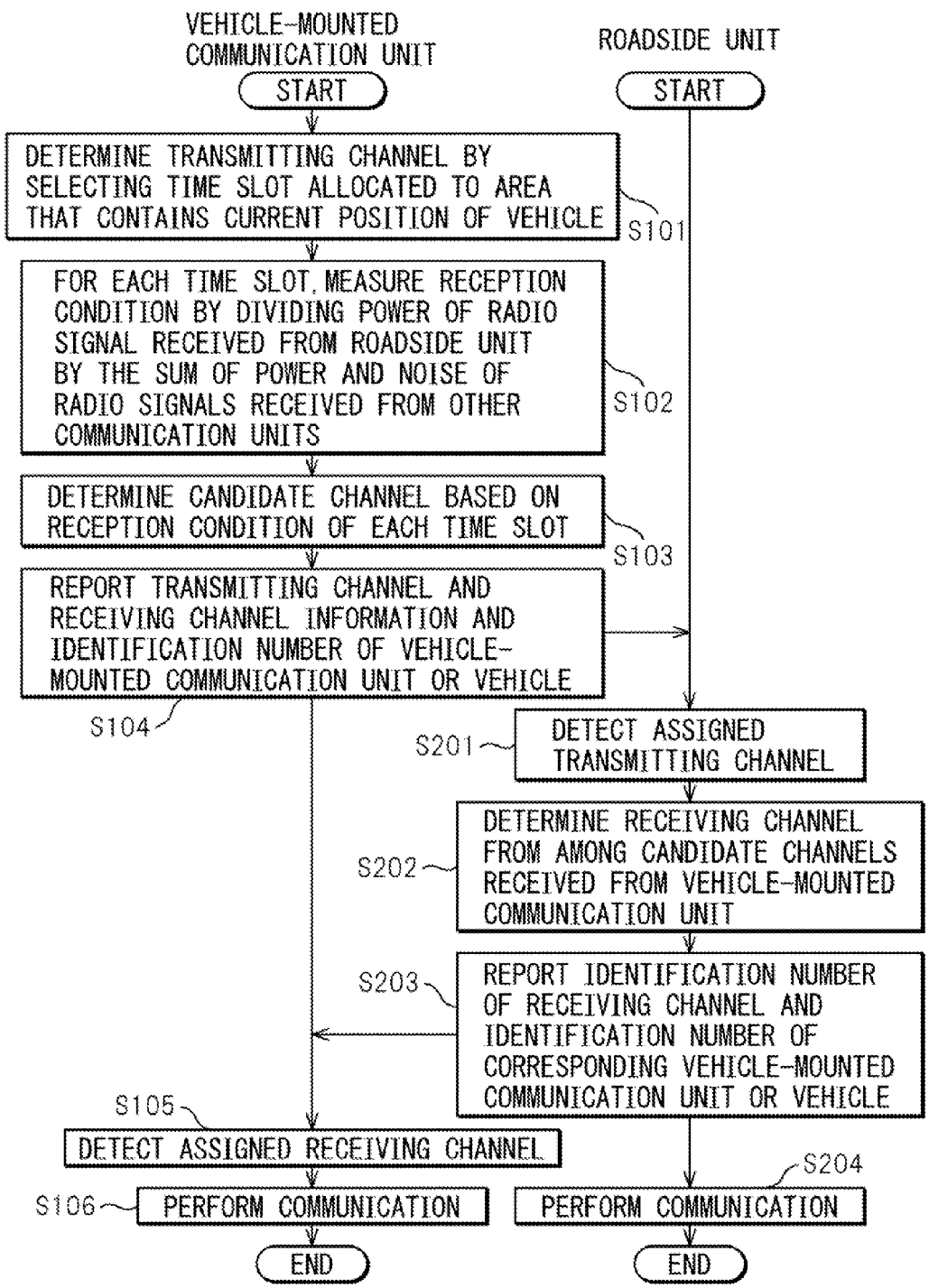
FIG. 8 is a sequence diagram illustrating a communication control process performed in the communication system according to the one embodiment in order to determine the time slots to be used for communication between the vehicle-mounted communication unit and the roadside unit.

FIG. 8 is a sequence diagram illustrating a communication control process for determining the time slots to be used for communication between the vehicle-mounted communication unit 10-1 and the roadside unit 20. The process performed in the vehicle-mounted communication unit 10-1 is illustrated in the left-hand part of FIG. 8, and the process performed in the roadside unit 20 is illustrated in the right-hand part of FIG. 8. The communication control process is performed periodically, for example, for every frame.

The transmitting channel determining unit 14 in the vehicle-mounted communication unit 10-1 determines the transmitting channel by selecting the time slot allocated to the slot designation area that contains the current position of the vehicle 2-1 equipped with the vehicle-mounted communication unit 10-1 (step S101). Then, the transmitting channel determining unit 14 passes the identification number of the thus determined transmitting channel to the channel information reporting unit 17 and the communication execution unit 19.

For each time slot, the communication condition measuring unit 15 measures the reception condition of the radio signal received from the roadside unit 20 by dividing the power of the radio signal received from the roadside unit 20 by the sum of the power and noise of the radio signals received from other vehicle-mounted communication units (step S102). Then, the communication condition measuring unit 15 reports the reception condition measurement representing the reception condition of each time slot to the receiving channel candidate determining unit 16 together with the identification number of the corresponding time slot.

The receiving channel candidate determining unit 16 determines a candidate channel based on the reception condition of each time slot (step S103). Then, the receiving channel candidate determining unit 16 reports the identification number of the candidate channel to the channel information reporting unit 17.

The channel information reporting unit 17 creates the reporting signal that carries the identification number of the transmitting channel, the candidate channel information carrying the identification number of the candidate channel, and the identification number of the vehicle-mounted communication unit or vehicle. Then, the channel information reporting unit 17 reports the identification number of the transmitting channel, the candidate channel information, and the identification number of the vehicle-mounted communication unit or vehicle to the roadside unit 20 by transmitting the reporting signal via the modulator/demodulator 12 and via the antenna 11 to the roadside unit 20 (step S104).

On the other hand, the transmitting channel detection unit 25 in the roadside unit 20 detects the transmitting channel of the vehicle-mounted communication unit 10-1 by referring to the reporting signal received from the vehicle-mounted communication unit 10-1 (step S201). Then, the transmitting channel detection unit 25 reports the identification number of the transmitting channel and the identification number of the corresponding vehicle-mounted communication unit or vehicle to the communication execution unit 26.

The receiving channel assigning unit 23 determines the receiving channel from among the candidate channels received from the vehicle-mounted communication unit (step S202). Then, the receiving channel assigning unit 23 passes the identification number of the receiving channel assigned to the vehicle-mounted communication unit and the identification number of the corresponding vehicle-mounted communication unit or vehicle to the receiving channel reporting unit 24 and the communication execution unit 26.

The receiving channel reporting unit 24 creates a reporting signal by including therein the identification number of the receiving channel and the identification number of the corresponding vehicle-mounted communication unit or vehicle. Then, the receiving channel reporting unit 24 transmits the reporting signal over the designated communication channel to the vehicle-mounted communication unit and thereby reports the identification number of the receiving channel and the identification number of the corresponding vehicle-mounted communication unit or vehicle to the vehicle-mounted communication unit located within the communication range of the roadside unit 20 (step S203).

On the other hand, the receiving channel detection unit 18 in the vehicle-mounted communication unit 10-1 receives the reporting signal from the roadside unit 20 and detects the receiving channel assigned to the vehicle-mounted communication unit 10-1 (step S105). Then, the receiving channel detection unit 18 reports the identification number of the receiving channel to the communication execution unit 19.

The communication execution unit 19 performs communication with the roadside unit 20 by using the thus determined transmitting and receiving channels (S106).

Likewise, the communication execution unit 26 in the roadside unit 20 communicates with the vehicle-mounted communication unit located within the communication range of the roadside unit 20 by using the transmitting and receiving channels (S204).

The order of step S101 and steps S102 and S103 may be interchanged. Further, the order of steps S201 and S202 may also be interchanged.

As described above, in the communication system, each vehicle-mounted communication unit measures the reception condition of the radio signal received from the roadside unit for each time slot by taking into account the influence of signals being transmitted from other communication units. Then, each vehicle-mounted communication unit reports one or more time slots with good reception conditions to the roadside unit as candidate channels for the time slots to be used to receive the signal from the roadside unit. On the other hand, the roadside unit that received the candidate channels from the plurality of vehicle-mounted communication units simultaneously wishing to communicate with the roadside unit assigns, from among the received candidate channels, mutually different time slots as the receiving channels for the respective vehicle-mounted communication units. As a result, in this communication system, even when a plurality of vehicle-mounted communication units are simultaneously located within the communication range of the roadside unit, the roadside unit can communicate with each vehicle-mounted communication unit.

A modified example of the above embodiment will be described below.

Figure 9:
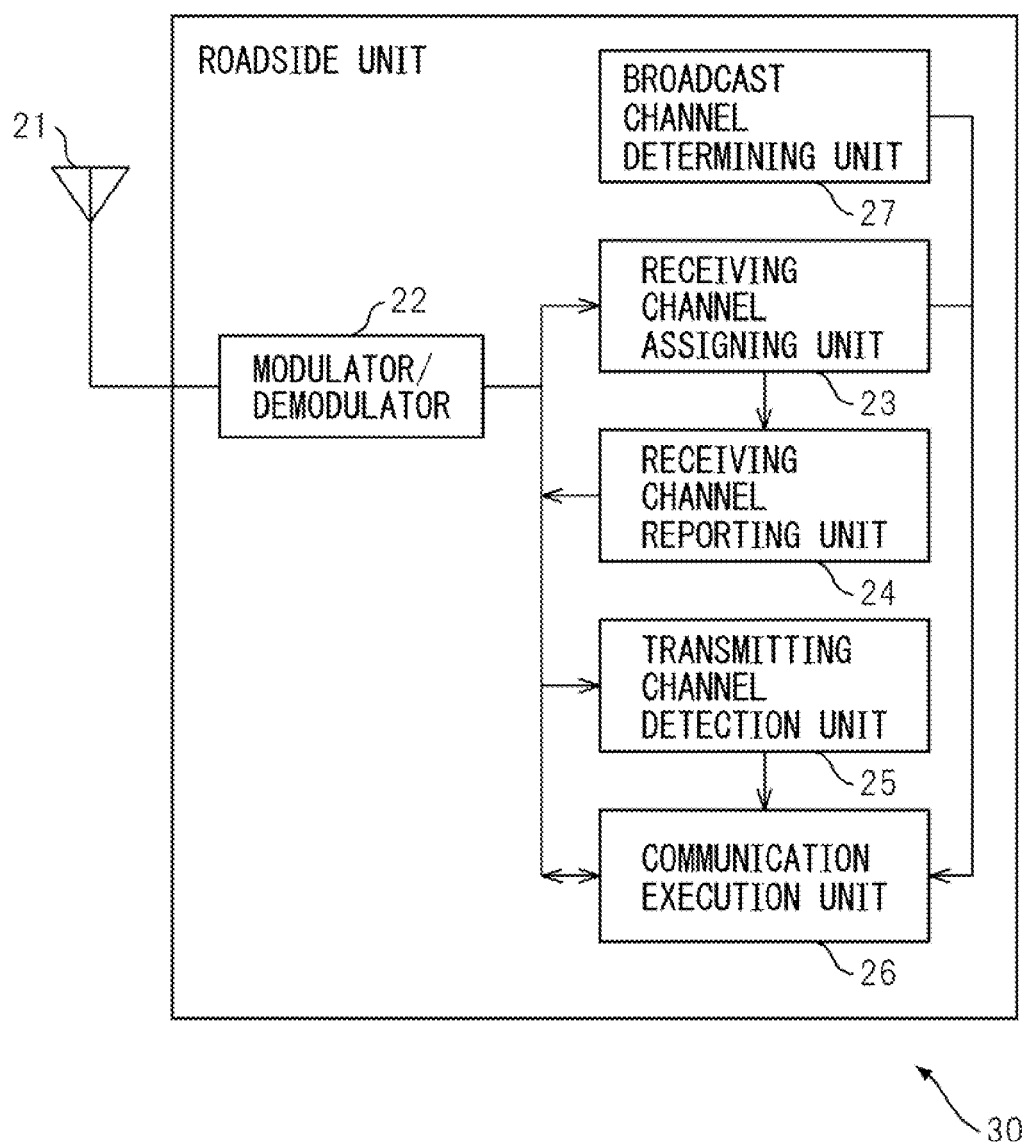
FIG. 9 is a diagram schematically illustrating the configuration of a roadside unit according to another embodiment.

FIG. 9 is a diagram schematically illustrating the configuration of a roadside unit according to another embodiment. As illustrated in FIG. 9, the roadside unit 30 includes an antenna 21, a modulator/demodulator 22, a receiving channel assigning unit 23, a receiving channel reporting unit 24, a transmitting channel detection unit 25, a communication execution unit 26, and a broadcast channel determining unit 27. In FIG. 9, the component elements of the roadside unit 30 that correspond to those of the roadside unit 20 illustrated in FIG. 5 are designated by the same reference numerals as those used in FIG. 5. The roadside unit 30 differs from the roadside unit 20 of FIG. 5 by the inclusion of the broadcast channel determining unit 27.

The broadcast channel determining unit 27 determines the broadcast slot, a time slot that the roadside unit 30 uses when transmitting identical information to all the vehicle-mounted communication units located within the communication range of the roadside unit 30.

For example, the broadcast channel determining unit 27 stores in its internal memory circuit the identification number of the time slot allocated to the slot designation area where the roadside unit 30 is installed. Then, the broadcast channel determining unit 27 determines the broadcast slot by selecting the time slot specified by the identification number stored in the internal memory circuit.

For example, referring back to FIG. 4, the time slot 5 is allocated to the area where the roadside unit 30 is installed. Therefore, the broadcast channel determining unit 27 selects the time slot 5 as the broadcast slot.

The broadcast channel determining unit 27 reports the identification number of the broadcast slot to the receiving channel assigning unit 23, the receiving channel reporting unit 24, and the communication execution unit 26.

The receiving channel assigning unit 23 determines the receiving channel from among the candidate channels reported from each vehicle-mounted communication unit but excluding the broadcast slot.

Except that the broadcast slot is excluded, the receiving channel assigning unit 23 determines the receiving channel in the same manner as in one of the methods described in the foregoing embodiment.

The receiving channel reporting unit 24 reports the identification number of the receiving channel assigned to each vehicle-mounted communication unit to the corresponding vehicle-mounted communication unit together with the identification number of the broadcast slot. For this purpose, the receiving channel reporting unit 24 creates a reporting signal by including therein the identification number of the broadcast slot as well as the identification number of the receiving channel and the identification number of the vehicle-mounted communication unit or vehicle assigned that receiving channel. Then, the receiving channel reporting unit 24 passes the reporting signal to the modulator/demodulator 22 so that the reporting signal will be transmitted using the time slot preassigned to transmit the control information to each vehicle-mounted communication unit located within the communication range of the roadside unit 30.

In the case of a signal to be transmitted to all the vehicle-mounted communication units located within the communication range of the roadside unit 30, the communication execution unit 26 passes the signal to the modulator/demodulator 22 so that the signal will be transmitted using the broadcast slot. On the other hand, in the case of a signal to be transmitted to a particular one of the vehicle-mounted communication units, the communication execution unit 26 passes the signal to the modulator/demodulator 22 so that the signal will be transmitted using the receiving channel assigned to that particular vehicle-mounted communication unit.

The receiving channel detection unit in the vehicle-mounted communication unit acquires the identification number of the receiving channel from the reporting signal received from the roadside unit 30. The receiving channel detection unit further acquires the identification number of the broadcast slot from the reporting signal. Then, the receiving channel detection unit passes the identification number of the receiving channel and the identification number of the broadcast slot to the communication execution unit.

In an alternative embodiment, the channel information reporting unit in the vehicle-mounted communication unit may include in the reporting signal to be transmitted to the roadside unit the reception condition measurements of all the time slots that the roadside unit can use to transmit signals to the vehicle-mounted communication unit. In this case, it is not necessary to select candidate channels at the vehicle-mounted communication unit, because the receiving channel assigning unit in the roadside unit can take all the time slots as the candidate channels. Therefore, in this case, the receiving channel candidate determining unit in the vehicle-mounted communication unit may be omitted.

In a further alternative embodiment, instead of including the identification number of the transmitting channel in the reporting signal, the channel information reporting unit in the vehicle-mounted communication unit may include the current position information of the vehicle equipped with the vehicle-mounted communication unit or the identification number of the slot designation area where the vehicle-mounted communication unit is located. In this case, the transmitting channel detection unit in the roadside unit includes a memory circuit for storing map information that includes information indicating all the slot designation areas contained in the communication range of the roadside unit and the time slot identification number assigned to each slot designation area. The transmitting channel detection unit can then detect the transmitting slot by matching the current position information of the vehicle or the identification number of the slot designation area carried in the reporting signal received from the vehicle-mounted communication unit, against the map information read out of the memory circuit.

In a still further alternative embodiment, the vehicle-mounted communication unit may be used only for receiving signals from the roadside unit.

Figure 10:
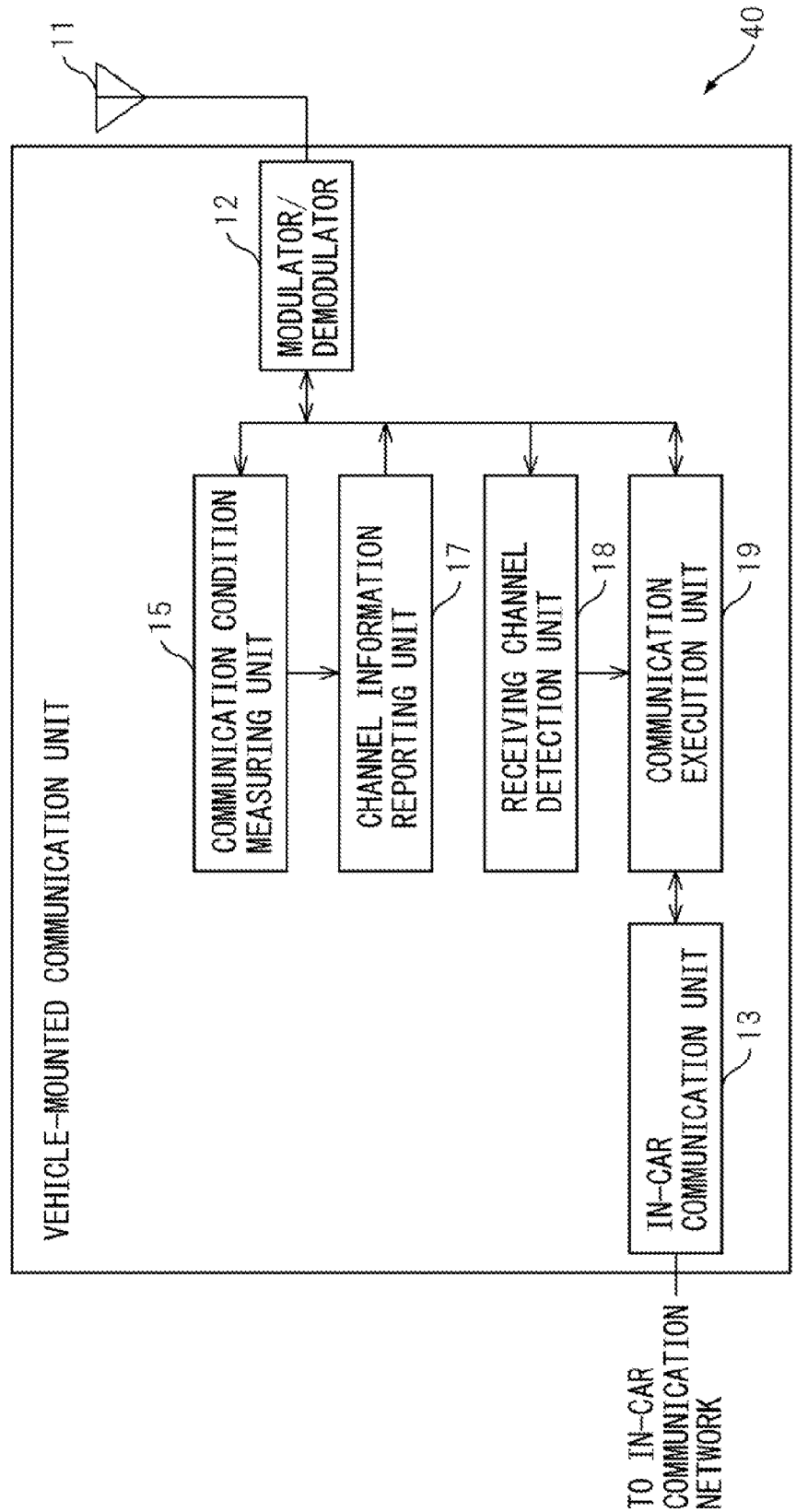
FIG. 10 is a diagram schematically illustrating the configuration of a vehicle-mounted communication unit according to still another embodiment.

FIG. 10 is a diagram schematically illustrating the configuration of a vehicle-mounted communication unit 40 which is used only for receiving signals from the roadside unit. The vehicle-mounted communication unit 40 includes an antenna 11, a modulator/demodulator 12, an in-car communication unit 13, a communication condition measuring unit 15, a channel information reporting unit 17, a receiving channel detection unit 18, and a communication execution unit 19. In FIG. 10, the component elements of the vehicle-mounted communication unit 40 that correspond to those of the vehicle-mounted communication unit 10-1 illustrated in FIG. 2 are designated by the same reference numerals as those used in FIG. 2.

The vehicle-mounted communication unit 40 need not determine the transmitting channel to be used for signal transmission to the roadside unit. The vehicle-mounted communication unit 40 includes in the reporting signal to be transmitted to the roadside unit the reception condition measurements of all the time slots that the roadside unit can use to transmit signals to the vehicle-mounted communication unit. That is, the vehicle-mounted communication unit 40 designates as the candidate channels all the time slots that can be used for signal transmission from the roadside unit to the vehicle-mounted communication unit. As a result, the vehicle-mounted communication unit 40 differs from the vehicle-mounted communication unit 10-1 by the exclusion of the transmitting channel determining unit and the receiving channel candidate determining unit.

Figure 11:
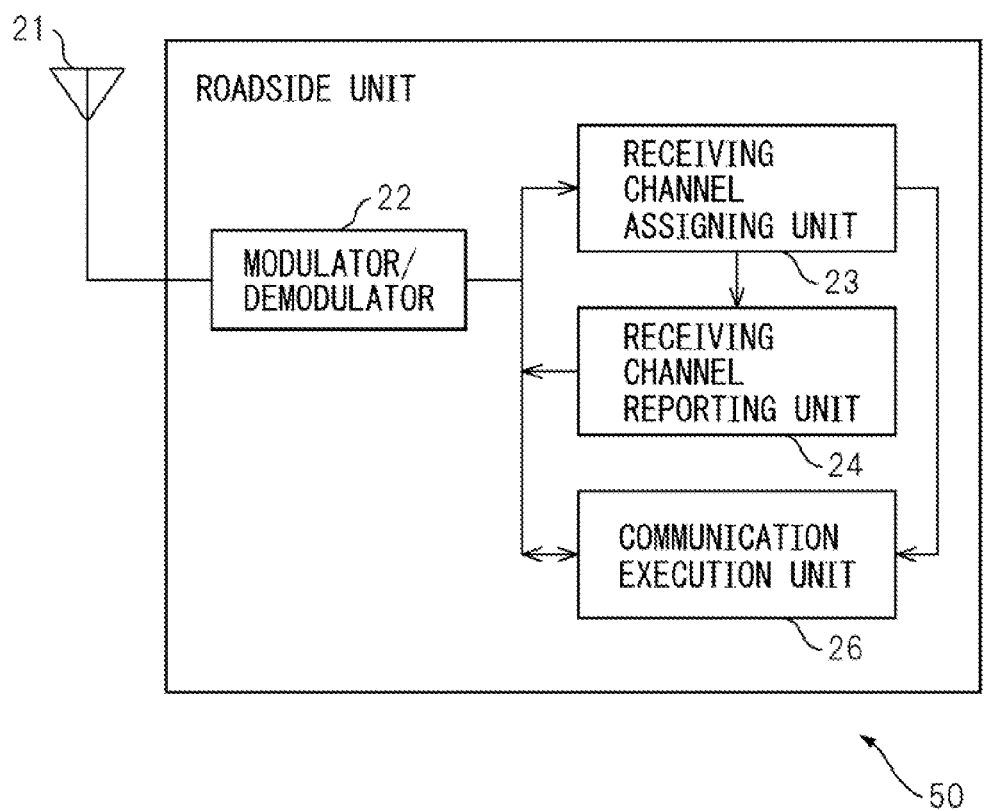
FIG. 11 is a diagram schematically illustrating the configuration of a roadside unit according to yet another embodiment.

FIG. 11 is a diagram schematically illustrating the configuration of another example of the roadside unit which communicates with the vehicle-mounted communication unit 40. The roadside unit 50 illustrated in FIG. 11 includes an antenna 21, a modulator/demodulator 22, a receiving channel assigning unit 23, a receiving channel reporting unit 24, and a communication execution unit 26. In FIG. 11, the component elements of the roadside unit 50 that correspond to those of the roadside unit 20 illustrated in FIG. 5 are designated by the same reference numerals as those used in FIG. 5. Since the roadside unit 50 does not receive signals from the vehicle-mounted communication unit 40, it is not necessary to detect a time slot to be used by the vehicle-mounted communication unit 40 for signal transmission to the roadside unit 50. As a result, the roadside unit 50 differs from the roadside unit 20 of FIG. 5 by the exclusion of the transmitting channel detection unit.

The vehicle-mounted communication unit described in each of the above embodiments may be a mobile communication unit mounted on a mobile vehicle other than a motor vehicle. For example, the mobile communication unit may be mounted on a bicycle or may even be carried by a pedestrian.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising a roadside unit and a mobile communication unit that performs communication with said roadside unit by using one of a plurality of communication channels, wherein said mobile communication unit comprises:
   a communication condition measuring unit which, based on radio signals received from said roadside unit and other communication units, obtains for each of said plurality of communication channels a reception condition measurement representing a reception condition of the radio signal received from said roadside unit; and
   a channel information reporting unit which selects at least one of said plurality of communication channels as a candidate channel, and which reports candidate channel information determined based on the reception condition measurement of said candidate channel to said roadside unit, and
   said roadside unit comprises:
   a receiving channel assigning unit which, based on said candidate channel information, assigns from among said candidate channels a receiving channel that said mobile communication unit is to use to receive the radio signal from said roadside unit; and
   a receiving channel reporting unit which reports said receiving channel to said mobile communication unit.

2. The communication system according to claim 1, wherein said communication condition measuring unit in said mobile communication unit calculates said reception condition measurement by dividing power of a preamble signal contained in the radio signal received from said roadside unit by the sum of power and noise of a radio signal received on each communication channel a predetermined number of frames back.

3. The communication system according to claim 1, said mobile communication unit further comprises a receiving channel candidate determining unit which, based on the reception condition measurement of each of said plurality of communication channels, selects at least one communication channel as said candidate channel in order of decreasing reception condition, starting with the communication channel having the best reception condition.

4. The communication system according to claim 1, wherein said channel information reporting unit in said mobile communication unit creates said candidate channel information by including therein the reception condition measurement of said candidate channel.

5. The communication system according to claim 4, wherein when a plurality of mobile communication units are located within a communication range of said roadside unit, said receiving channel assigning unit in said roadside unit sequentially assigns receiving channels to said plurality of mobile communication units by selecting candidate channels in sequence, starting with the candidate channel having the highest reception condition measurement, from among the candidate channels that are associated with the respective mobile communication units not yet assigned any receiving channel and that are not used as receiving channels for any other mobile communication units.

6. The communication system according to claim 4, wherein when a plurality of mobile communication units are located within a communication range of said roadside unit, said receiving channel assigning unit in said roadside unit identifies, for each of said plurality of mobile communication units, a preferential candidate channel that has the highest reception condition measurement among said candidate channels associated with said each mobile communication unit, and sequentially assigns receiving channels to said plurality of mobile communication units by selecting said preferential candidate channels in sequence, starting with the preferential candidate channel having the lowest reception condition measurement among said preferential candidate channels.

7. The communication system according to claim 4, wherein based on the reception condition measurement of said candidate channel reported from said mobile communication unit, said receiving channel assigning unit in said roadside unit assigns at least one receiving channel to said mobile communication unit so that instantaneous throughput of the radio signal to be transmitted from said roadside unit to said mobile communication unit does not become lower than a predetermined value.

8. A communication control method for use in a communication system including a roadside unit and a mobile communication unit that performs communication with said roadside unit by using one of a plurality of communication channels, the communication control method comprising:
   obtaining, by said mobile communication unit, based on radio signals received from said roadside unit and other communication units, for each of said plurality of communication channels a reception condition measurement representing a reception condition of the radio signal received from said roadside unit;

selecting, by said mobile communication unit, at least one of said plurality of communication channels as a candidate channel;

reporting, by said mobile communication unit, candidate channel information determined based on the reception condition measurement of said candidate channel to said roadside unit;

assigning, by said roadside unit, based on said candidate channel information, from among said candidate channels a receiving channel that said mobile communication unit is to use to receive the radio signal from said roadside unit; and reporting, by said roadside unit, said receiving channel to said mobile communication unit.

9. A roadside unit that performs communication with a mobile communication unit by using one of a plurality of communication channels, comprising:

a receiving channel assigning unit which assigns from among said plurality of communication channels a receiving channel that said mobile communication unit is to use to receive a radio signal from said roadside unit, based on a reception condition measurement representing a reception condition of the radio signal received from said roadside unit, said reception condition measurement being calculated for each of said plurality of communication channels by said mobile communication unit based on radio signals received from said roadside unit and other communication units;

a receiving channel reporting unit which reports said receiving channel to said mobile communication unit; and a communication execution unit which performs communication with said mobile communication unit by using said receiving channel.

10. A mobile communication unit that performs communication with a roadside unit by using one of a plurality of communication channels, comprising:

a communication condition measuring unit which, based on radio signals received from said roadside unit and other communication units, obtains for each of said plurality of communication channels a reception condition measurement representing a reception condition of the radio signal received from said roadside unit; and a channel information reporting unit which selects at least one of said plurality of communication channels as a candidate channel, and which reports candidate channel information determined based on the reception condition measurement of said candidate channel to said roadside unit, a receiving channel detection unit which detects from a signal received from said roadside unit via a predetermined channel among said plurality of communication channels, a receiving channel which is assigned from among said candidate channels by said roadside unit and is to be used to receive a radio signal from said roadside unit by said mobile communication unit, and a communication execution unit which performs communication with said roadside unit by using said receiving channel.

* * * * *